US010054230B2

(12) United States Patent
Katori et al.

(10) Patent No.: US 10,054,230 B2
(45) Date of Patent: Aug. 21, 2018

(54) MECHANICAL SEAL (71) Applicant: EAGLE INDUSTRY CO., LTD., Tokyo (JP)

(72) Inventors: Hikaru Katori, Tokyo (JP); Keiichi Chiba, Tokyo (JP); Masatoshi Itadani, Tokyo (JP)

(73) Assignee: EAGLES INDUSTRY CO., LTD. (JP)

( * ) Notice: Subject to any disclaimer, the term of this patent is extended or adjusted under 35 U.S.C. 154(b) by 0 days.

(21) Appl. No.: 15/504,266

(22) PCT Filed: Sep. 3, 2015

(86) PCT No.: PCT/JP2015/075098
§ 371 (c)(1),
(2) Date: Feb. 15, 2017

(87) PCT Pub. No.: WO2016/035860
PCT Pub. Date: Mar. 10, 2016

(65) Prior Publication Data
US 2017/0234431 A1    Aug. 17, 2017

(30) Foreign Application Priority Data
Sep. 4, 2014    (JP) ................. 2014-180336

(51) Int. Cl.
*F16J 15/34*    (2006.01)
(52) U.S. Cl.
CPC ........... *F16J 15/3412* (2013.01); *F16J 15/34* (2013.01); *F16J 15/342* (2013.01); *F16J 15/3416* (2013.01)

(58) Field of Classification Search
CPC .............................. F16J 15/3412; F16J 15/342
See application file for complete search history.

(56) References Cited

U.S. PATENT DOCUMENTS

| 5,385,409 A | * | 1/1995 | Ide | F16J 15/3432 |
| | | | | 277/400 |
| 5,447,316 A | * | 9/1995 | Matsui | F16J 15/3412 |
| | | | | 277/400 |

(Continued)

FOREIGN PATENT DOCUMENTS

| CN | 1415877 | 5/2003 | ............... F16J 15/34 |
| CN | 202327105 | 7/2012 | ............... F16J 15/16 |

(Continued)

OTHER PUBLICATIONS

International Preliminary Report on Patentability issued in application No. PCT/JP2015/075098, dated Mar. 16, 2017 (6 pgs).

(Continued)

*Primary Examiner* — Gilbert Y Lee
(74) *Attorney, Agent, or Firm* — Hayes Soloway P.C.

(57) ABSTRACT

Provided is a mechanical seal includes a fluid introduction groove provided in a sealing face of a stationary sealing ring and having an opening portion which is opened to the sealed fluid and an end portion which is provided opposite to the opening portion. The end portion being located between respective sealing faces S, the fluid introduction groove introducing the sealed fluid from the opening portion to a clearance between the respective sealing faces S. The fluid introduction groove is provided to be inclined at an acute angle to the sealing face S of the stationary sealing ring in a direction from the end portion to the opening portion.

5 Claims, 7 Drawing Sheets

(56) References Cited

U.S. PATENT DOCUMENTS

| | | | | |
|---|---|---|---|---|
| 9,151,389 | B2* | 10/2015 | Itadani | F16J 15/3412 |
| 9,353,867 | B2* | 5/2016 | Itadani | F16J 15/3412 |
| 9,587,745 | B2* | 3/2017 | Itadani | F16J 15/348 |
| 9,765,892 | B2* | 9/2017 | Itadani | F16J 15/40 |
| 9,777,840 | B2* | 10/2017 | Tokunaga | F16J 15/348 |
| 9,863,473 | B2* | 1/2018 | Hosoe | F16C 33/741 |
| 2013/0209011 | A1* | 8/2013 | Tokunaga | F16C 17/045 |
| | | | | 384/123 |
| 2014/0167361 | A1 | 6/2014 | Osada et al. | F16L 15/34 |
| 2015/0123350 | A1* | 5/2015 | Itadani | F16J 15/3424 |
| | | | | 277/400 |
| 2015/0240950 | A1 | 8/2015 | Takahashi | |
| 2015/0260292 | A1 | 9/2015 | Inoue et al. | F16J 15/342 |

FOREIGN PATENT DOCUMENTS

| | | | |
|---|---|---|---|
| CN | 103486268 | 1/2014 | F16J 15/16 |
| CN | 103620277 | 3/2014 | F16J 15/34 |
| DE | 2222043 | 11/1973 | F16J 15/34 |
| JP | S638478 | 1/1988 | F04D 29/12 |
| JP | H0564573 | 8/1993 | F16J 15/34 |
| JP | 2002333069 | 11/2002 | F04D 29/02 |
| JP | 2005113983 | 4/2005 | F16J 15/34 |
| JP | 2012002295 | 1/2012 | F16J 15/34 |
| JP | 2013200005 | 10/2013 | F16J 15/34 |
| WO | WO2014061543 | 4/2014 | F16J 15/34 |
| WO | WO2014112455 | 7/2014 | F16J 15/34 |

OTHER PUBLICATIONS

International Search Report (w/translation) and Written Opinion (w/o translation) issued in application No. PCT/JP2015/075098, dated Nov. 17, 2015 (9 pgs).

Chinese Office Action (w/translation) issued in application No. 201580043935.0, dated Oct. 25, 2017 (10 pgs).

* cited by examiner

MECHANICAL SEAL

TECHNICAL FIELD

The present invention relates to a mechanical seal used in automobiles, general industrial machineries, and other fields requiring seals, and particularly to a contact type mechanical seal for sealing a fluid of a mixture of a liquid intended for use in compression machines, pumps, or the like and a gas.

BACKGROUND ART

A conventional mechanical seal device may have various problems caused by a sealed fluid when the mechanical seal device seals a clearance between rotating components of an apparatus which uses a chemical fluid, in particular, a refrigerant oil, a cooling medium, or the like. For example, in a case where a sealed fluid (working fluid) existing around a rotating shaft of a supply device (pump), a chemical device, or the like which supplies a refrigerant oil and an ammonia refrigerant is sealed, for example in a car air-conditioner, a refrigerator compression machine, or the like, there have been revealed various problems caused by a sealed fluid, such as a lack of a lubrication action on a sealing face of a mechanical seal. In particular, in a case where a sealed fluid such as a chemical fluid is sealed by a mechanical seal, a reaction substance or volatilized gas of the chemical fluid is generated between sliding sealing faces of a pair of sealing rings relatively sliding against each other and therefore heat may be generated due to sliding. In addition, a squeaking phenomenon between the sealing faces of the mechanical seal makes uncomfortable noises to the surrounding area. Furthermore, sealing performance of the sealing faces is deteriorated by the heat generated between the sliding sealing faces and therefore the sealed fluid may leak. Likewise, the sealing rings may be worn by the sealed fluid to be damaged thereby. These problems need to be urgently solved.

In such circumstance, there has been conventionally known a structure which is provided with a fluid introduction groove including: an opening which is formed in one of flat surfaces of sliding sealing faces of a pair of sealing rings relatively sliding against each other and which is opened to one of radially outward and inward sides; and an end portion which is located radially opposite to the opening so as to be in plane with the flat surface. The fluid introduction groove is configured to introduce a sealed fluid with lubricating property from the opening to the sliding sealing faces of the sealing rings relatively sliding against each other, thereby improving lubricity of the sealing faces (the structure will be hereinafter referred to as "a conventional technique"; for example, see Patent Citations 1 to 3).

CITATION LIST

Patent Literature

Patent Citation 1: Japanese Unexamined Patent Application Publication No. 2012-002295
Patent Citation 2: Japanese Unexamined Patent Application Publication No. 2002-333069
Patent Citation 3: Japanese Unexamined Patent Application Publication No. 2005-113983

SUMMARY OF INVENTION

Technical Problem

In the aforementioned conventional technique, for example, one of the sealing rings is located at a high-pressure side at which the sealed fluid with lubricating property exists while the other of the sealing rings is located at a low-pressure side at which a gas exists, and the radially inward side and the radially outward side are sealed. In addition, the sealed fluid with lubricating property is a liquid, for example, water, oil, or slurry liquid.

However, in a case where the sealed fluid with lubricating property is, for example, a fluid in which oil in the form of mist exists in a gas, just providing the fluid introduction groove with a depth of about several microns does not allow the oil to be sufficiently circulated to the sliding sealing faces and thus the sliding sealing faces may not be sufficiently lubricated.

Therefore, it is an object for the present invention to provide a mechanical seal which can improve a lubricated condition of a sealing face even in a case where a sealed fluid is, for example, a fluid in which a lubricative liquid such as oil in the form of mist exists in a gas.

Solution to Problem

In order to achieve the aforementioned purpose, according to a first aspect of the present invention, in a mechanical seal that includes: an annular stationary sealing ring fixed to a fixed side; an annular rotating sealing ring configured to rotate along with a rotating shaft in a facing manner to the stationary sealing ring to rotate respective sealing faces relative to each other to seal a sealed fluid which exists at one side in a radial direction of the respective sealing faces that rotate and slide relative to each other, the mechanical seal is characterized by further including a fluid introduction groove provided in the sealing face of the stationary sealing ring and having an opening portion which is opened to the sealed fluid and an end portion which is provided opposite to the opening portion, the end portion of the fluid introduction groove being located between the respective sealing faces, the fluid introduction groove introducing the sealed fluid from the opening portion to a clearance between the respective sealing faces, the fluid introduction groove being provided to be inclined at an acute angle to the sealing face of the stationary sealing ring in a direction from the end portion to the opening portion.

According to this aspect, even in a case where the sealed fluid is, for example, a fluid of a mixture of a gas in which a lubricative liquid such as oil in the form of mist exists and a liquid, the lubricative liquid in the form of mist is attached to or condensed in the opening portion of the fluid introduction groove to be supplied by the gravity of the lubricative liquid and by a pressure difference between the opening portion and the end portion to the clearance between the respective sealing faces of the rotating sealing ring and the stationary sealing ring that face each other; therefore, a lubricated condition of the respective sealing faces can be improved.

Further, according to a second aspect of the present invention related to the first aspect, the mechanical seal is characterized by further including a fluid circulation groove provided in one of the sealing faces, relatively sliding against each other, of a pair of sliding components, the fluid circulation groove including: an inlet portion through which the fluid flows in from a high-pressure fluid side; an outlet portion through which the fluid flows out to the high-pressure fluid side; and a communication portion which allows communication between the inlet portion and the outlet portion, the fluid circulation groove being separated from a low-pressure fluid side by a land portion, wherein the fluid introduction groove is formed at least in the inlet portion among the inlet portion and the outlet portion.

According to this aspect, the fluid circulation groove is provided in the sealing face and the fluid introduction groove is provided at least in the inlet portion of the fluid circulation groove, therefore increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces S can be further improved.

Furthermore, according to a third aspect of the present invention related to the first aspect, the mechanical seal is characterized by further including: a positive pressure generation mechanism provided at a sealed fluid side on the sealing face of the stationary sealing ring, which faces a sealed fluid side, for generating a positive pressure in accordance with relative rotation and sliding between the stationary sealing ring and the rotating sealing ring; an annular pressure release groove provided at a low-pressure side compared to the positive pressure generation mechanism, the pressure release groove being separated from the positive pressure generation mechanism in the radial direction by a land portion; and a radial groove provided to allow the pressure release groove to communicate with a high-pressure fluid side, the radial groove being positioned in contact with an upstream end portion of the positive pressure generation mechanism, wherein the fluid introduction groove is provided in the radial groove.

According to this aspect, in the mechanical seal where the lubricity is improved by the positive pressure generation mechanism and a sealing effect is improved by the pressure release groove, the fluid introduction groove is provided in the radial groove, therefore increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces can be further improved.

Further, in the mechanical seal according to a fourth aspect of the present invention related to the third aspect, the mechanical seal is characterized in that a pumping portion for producing a pumping effect to return the sealed fluid to a high-pressure side in accordance with the relative rotation and sliding between the stationary sealing ring and the rotating sealing ring is provided at a lower-pressure side compared to an annular portion of the pressure release groove, and a discharge end portion of the pumping portion is connected to the pressure release groove.

According to this aspect, the fluid likely to flow toward the low-pressure side due to the positive pressure (dynamic pressure) generated in the positive pressure generation mechanism at the high-pressure side is discharged to the high-pressure side; thereby, the sealing effect on the sealing face can be increased.

Furthermore, in the mechanical seal according to a fifth aspect of the present invention related to the third or fourth aspect, the mechanical seal is characterized in that the radial groove includes even numbers of radial grooves which are circumferentially arranged such that the radial grooves arranged next to each other are inclined in different directions from each other, and inlet ports of the radial grooves in one group are inclined toward an upstream side and outlet ports of the radial grooves in the other group are inclined toward a downstream side.

According to this aspect, in the mechanical seal where the lubricity is improved by the positive pressure generation mechanism and the sealing effect is improved by a spiral groove or the pressure release groove, the fluid introduction groove is provided in the radial groove that is inclined so that the sealed fluid may easily flow in and out, therefore further increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces can be further improved.

Advantageous Effects of Invention

The present invention achieves the following beneficial effects.

(1) Even in a case where the sealed fluid is, for example, a fluid of a mixture of a lubricative liquid such as oil in the form of mist exists and a liquid, the lubricative liquid in the form of mist is attached to or condensed in the opening portion of the fluid introduction groove to be supplied by the gravity of the lubricative liquid and by a pressure difference between the opening portion and the end portion to the clearance between the respective sealing faces of the rotating sealing ring and the stationary sealing ring that face each other; therefore, a lubricated condition of the respective sealing faces can be improved.

(2) The fluid circulation groove is provided in the sealing face and the fluid introduction groove is provided at least in the inlet portion of the fluid circulation groove, therefore increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces S can be further improved.

(3) In the mechanical seal where the lubricity is improved by the positive pressure generation mechanism and a sealing effect is improved by the pressure release groove, the fluid introduction groove is provided in the radial groove, therefore increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces can be further improved.

(4) The fluid likely to flow toward the low-pressure side due to the positive pressure (dynamic pressure) generated in the positive pressure generation mechanism at the high-pressure side is discharged to the high-pressure side; thereby, the sealing effect on the sealing face can be increased.

(5) In the mechanical seal where the lubricity is improved by the positive pressure generation mechanism and the sealing effect is improved by a spiral groove or the pressure release groove, the fluid introduction groove is provided in the radial groove that is inclined so that the sealed fluid may easily flow in and out, therefore further increasing the volume of the sealed fluid to be introduced to the sealing face. Thus, even in a case where the sealed fluid is, for example, a fluid of a mixture of a gas in which a lubricative liquid such as oil in the form of mist exists and a liquid, the lubricated condition of the respective sealing faces can be further improved.

BRIEF DESCRIPTION OF DRAWINGS

FIG. 2A is a front view, FIG. 2B is a cross-sectional view taken along the line A-A of FIG. 2A; and FIG. 2C and FIG. 2D illustrate plural examples of a fluid introduction groove;

FIG. 7 is an explanatory drawing illustrating a positive pressure generation mechanism configured by a Rayleigh step mechanism or the like.

DESCRIPTION OF EMBODIMENTS

Modes for carrying out the present invention will be described below with reference to the drawings and on the basis of embodiments for illustrative purposes. In addition, dimensions, materials, shapes, and their relative arrangements, or the like of components described in the embodiments are not intended to restrict the scope of the invention unless otherwise specifically stated.

First Embodiment

A mechanical seal according to a first embodiment of the Present invention will be described with reference to FIG. 1 and FIG. 2.

In addition, radially outward and inward sides of a sealing ring configuring the mechanical seal are respectively described as a high-pressure fluid side (sealed fluid side) and a low-pressure fluid side (atmosphere side) in the present embodiment; however, the present invention is not limited thereto. The high-pressure fluid side and the low-pressure fluid side may be reversely arranged.

Figure 1:
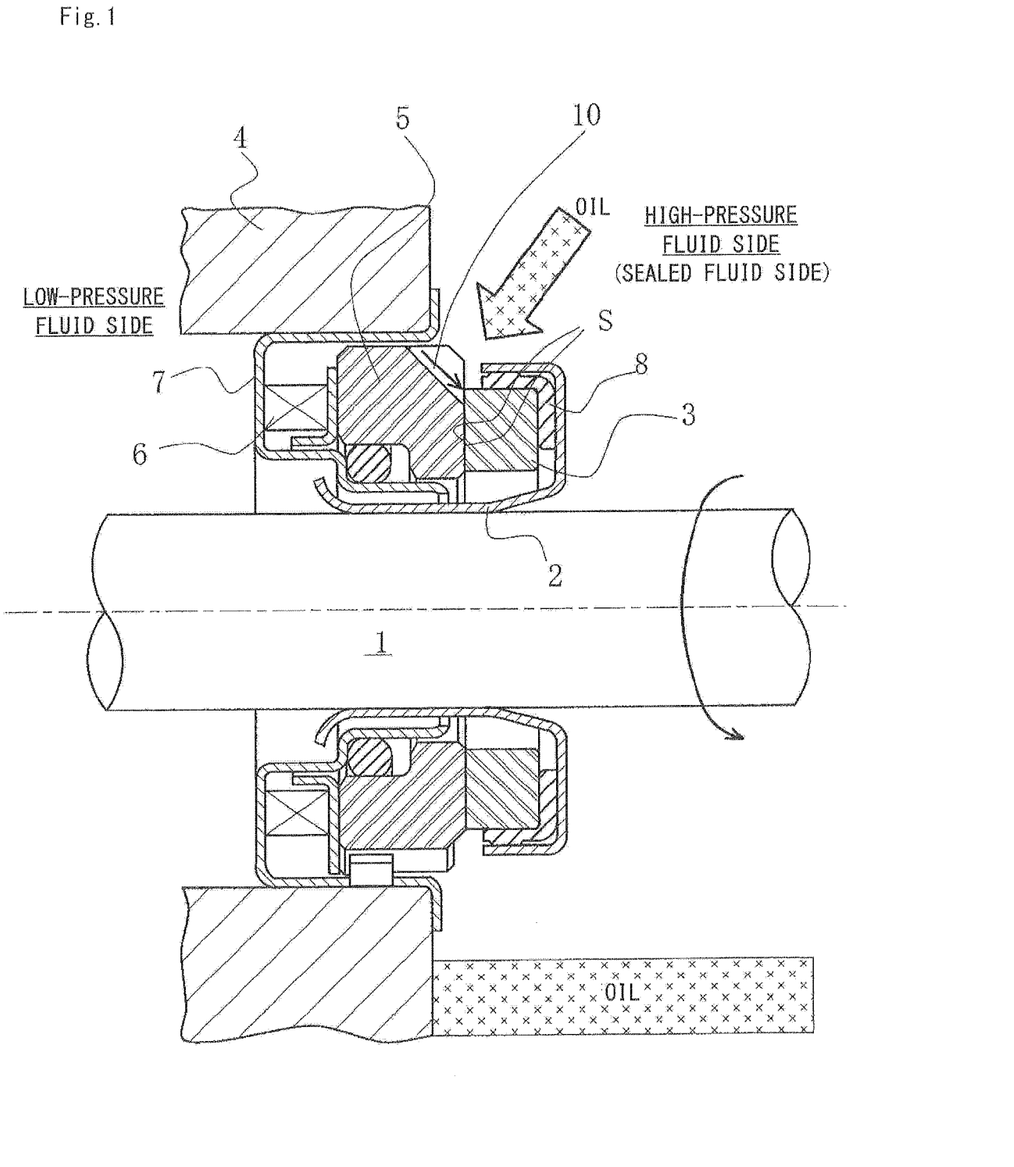
FIG. 1 is a vertical cross-sectional view illustrating an example of a mechanical seal according to a first embodiment of the present invention.

FIG. 1 is a vertical cross-sectional view illustrating an example of the mechanical seal. The mechanical seal is configured as an inside mechanical seal for sealing a sealed fluid at the high-pressure fluid side, which is likely to leak in a direction from the radially outward side to the radially inward side of a sealing face S (in the present specification, in a case where the sealing face S means respective sealing faces corresponding to a pair of sealing faces, the sealing face S will be referred to as "respective sealing faces S", and in addition, in a case where the pair of sealing faces is simply considered together, the sealing face S will be referred to as "a sealing face S"). The mechanical seal includes: an annular rotating sealing ring 3 serving as one sealing ring which is provided at a rotating shaft 1, configured to drive a rotary member (not shown) at the high-pressure fluid side, so as to integrally rotate with this rotating shaft 1 via a sleeve 2 and a cup gasket 8; and an annular stationary sealing ring 5 serving as the other sealing ring which is provided at a housing 4 so as not to rotate and so as to move in an axial direction. A biasing member 6 biases the stationary ring 5 in the axial direction; thereby, the respective sealing faces S processed by lapping or the like so as to have mirror-finished surfaces are allowed to slide against each other in a close contact manner. That is, this mechanical seal serves to prevent between the respective sealing faces S of the rotating sealing ring 3 and the stationary sealing ring 5, the sealed fluid from flowing from the high-pressure fluid side (radially outward side) to the low-pressure fluid side (radially inward side) of the sealing rings 3, 5.

The mechanical seal of the present invention is particularly suitable for sealing the sealed fluid, for example, in which a lubricative liquid such as oil in the form of mist exists in a gas. In FIG. 1, the respective sealing faces S of the rotating sealing ring 3 and the stationary sealing ring 5 are located in an atmosphere in which oil in the form of mist exists in a gas. Therefore, just providing a fluid introduction groove with a depth of about several microns does not allow the oil to be sufficiently circulated to the sealing face S and thus the sealing face S may not be sufficiently lubricated.

In addition, the lubricative liquid in the form of liquid such as oil is accumulated on a bottom portion at the high-pressure fluid side.

FIG. 2A is a front view of the sealing face S of the stationary sealing ring 5 of the mechanical seal according to the first embodiment of the present invention. A fluid introduction groove 10 having an opening portion 10a which is opened to the sealed fluid side and an end portion 10b which is provided opposite to the opening portion 10a in a radial direction, is formed in the sealing face S so that the end portion 10b is located between the respective sealing faces S, thereby introducing the sealed fluid from the opening portion 10a to a clearance between the respective sealing faces S. As shown in FIG. 2B, this fluid introduction groove 10 is provided so as to be inclined at an angle θ (acute angle) to the sealing face S of the stationary sealing ring 5 in a direction from the end portion 10b to the opening portion 10a, i.e. in a direction opposite to the sealing face S of the stationary sealing ring 5.

When a device on which the mechanical seal is mounted is brought into operation, the rotating sealing ring 3 is rotated. Along with this rotation, the sealed fluid in which the lubricative liquid such as oil in the form of mist exists is also circulated. At this time, the lubricative liquid such as oil is attached to the opening portion 10a of the fluid introduction groove 10 of the stationary sealing ring 5 and to an area surrounding the opening portion 10a. This attached lubricative liquid such as oil is introduced by a pressure difference between the opening portion 10a and the end portion 10b of the fluid introduction grove 10 and by the gravity through the fluid introduction groove 10 to the sealing face S between the rotating sealing ring 3 and the stationary sealing ring 5, therefore lubricating the sealing face S.

FIG. 1 shows a case where an outer diameter of the stationary sealing ring 5 is larger than an outer diameter of the rotating sealing ring 3; however, even in an opposite case, the present invention is applicable. In other words, even in a case where the outer diameter of the rotating sealing ring 3 is larger than the outer diameter of the stationary sealing ring 5, the sealed fluid can be introduced by the pressure difference between the opening portion 10a and the end portion 10b and by the gravity from the opening portion 10a to the clearance between the respective sealing faces S as long as the end portion 10b is located between the respective sealing faces S.

In a case where the outer diameter of the stationary sealing ring 5 is larger than the outer diameter of the rotating sealing ring 3 as shown in FIG. 1, the radially outward side of the stationary sealing ring 5 provided with the fluid introduction groove 10 may have a large area to be exposed to the sealed fluid and the opening portion 10a is likewise exposed to the sealed fluid. Therefore, a rate of the lubricative liquid in the form of mist which can be attached to or condensed in the opening portion 10a of the fluid introduction groove 10 increases. Consequently, an improvement of lubricity may be further expected.

The number of fluid introduction grooves 10 is determined by the thickness of a liquid film to be formed on the sealing face S. In addition, the liquid film thickness varies in accordance with use conditions of the mechanical seal, for example, the number of rotations, the kind of the sealed fluid, or the like. In the case of increasing the liquid film thickness on the sealing face S, it is necessary to increase the number of fluid introduction grooves 10, for example, by providing four, six, or more fluid introduction grooves 10 equi-angularly arranged.

In addition, positioning the fluid introduction groove 10 on an upper side of the sealing face S is of advantage because the gravity of the lubricative liquid can be used.

The fluid introduction groove 10 may apply various cross-sectional shapes, for example, a rectangular shape or a circular arc shape. In addition, a width and a depth of the fluid introduction groove 10 tend to be increased in a case where the liquid film thickness on the sealing face is increased; however, the width and depth vary in accordance with the number of rotations, the kind of the sealed fluid, or the like. The width of the fluid introduction groove 10 may vary in accordance with an outer diameter of the sealing face S, and the depth may vary in accordance with a width of the sealing face S. Further, FIGS. 1 and 2 show a case where a shape of a bottom surface 10c of the fluid introduction groove 10 in a longitudinal direction thereof is a linear shape, but not limited thereto. Alternatively, the shape may be a curved shape.

Further, the inclination angle θ of the fluid introduction groove 10 to the sealing face S may be an acute angle, but, for example, preferably, it ranges approximately from 5° to 45°. In a case where the inclination angle θ of the fluid introduction groove 10 is an acute angle, the sealed fluid attached to the opening portion 10a utilizes an inclined surface to fall by the gravity toward the end portion 10b, therefore penetrating between the respective sealing faces S. The smaller the inclination angle θ to the sealing face S is, the faster the falling speed is; however, the depth of the opening portion 10a is smaller. Therefore, an accommodating space may decrease. On the other hand, the larger the inclination angle θ is, the slower the falling speed is; however, the depth of the opening portion 10a is greater. Therefore, the accommodating space may increase.

As shown in FIG. 2C and FIG. 2D, there may be various shapes applicable as the shape of the fluid introduction groove 10 when viewed from the front.

In FIG. 2C, the fluid introduction groove 10 is configured so that side surfaces 10d, 10d in a circumferential direction form a V-shape which narrows from the opening portion 10a to the end portion 10b. Therefore, the lubricative liquid such as oil in the form of mist is effectively collected to be supplied to the sealing face S.

Further, in FIG. 2D, the side surface 10d of the fluid introduction groove 10 is configured so as to form a semicircular shape. Likewise, in this case, the lubricative liquid such as oil in the form of mist is effectively collected to be supplied to the sealing face S.

The aforementioned mechanical seal of the first embodiment is provided with the fluid introduction groove 10. The fluid introduction groove 10 having the opening portion 10a that is opened to the sealed fluid side and the end portion 10b that is provided opposite to the opening portion 10a, is formed in the sealing face S of the stationary sealing ring 5 so that the end portion 10b is located between the respective sealing faces S, thereby introducing the sealed fluid from the opening portion 10a to the clearance between the respective sealing faces S. In addition, the fluid introduction groove 10 is provided so as to be inclined at the angle θ (acute angle) to the sealing face S of the stationary sealing ring 5 in the direction from the end portion 10b to the opening portion 10a, i.e. in the direction opposite to the sealing face S of the stationary sealing ring 5. Therefore, the lubricative liquid in the form of mist is attached to or condensed in the opening portion 10a of the fluid introduction groove 10 to be supplied by the gravity and the pressure difference between the opening portion 10a and the end portion 101, to the clearance between the respective sealing faces S of the rotating sealing ring 3 and the stationary sealing ring 5 that face each other. As a result, the function effect that a lubricated condition of the respective sealing faces S can be improved is achieved.

Second Embodiment

The mechanical seal according to a second embodiment of the present invention will be described with reference to FIG. 3.

Figure 2:
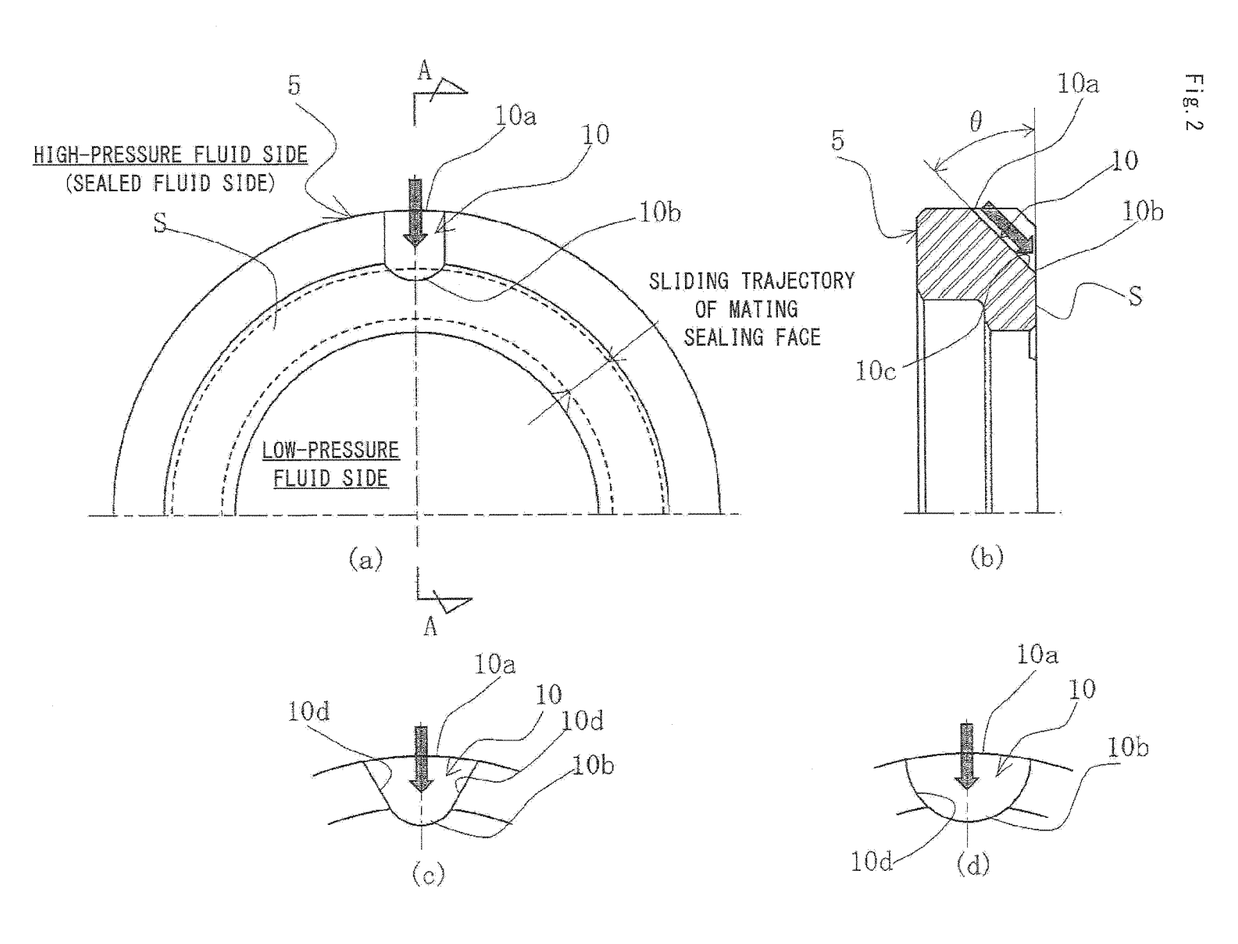
FIG. 2 illustrates a stationary sealing ring of the mechanical seal according to the first embodiment of the present invention.
Figure 3:
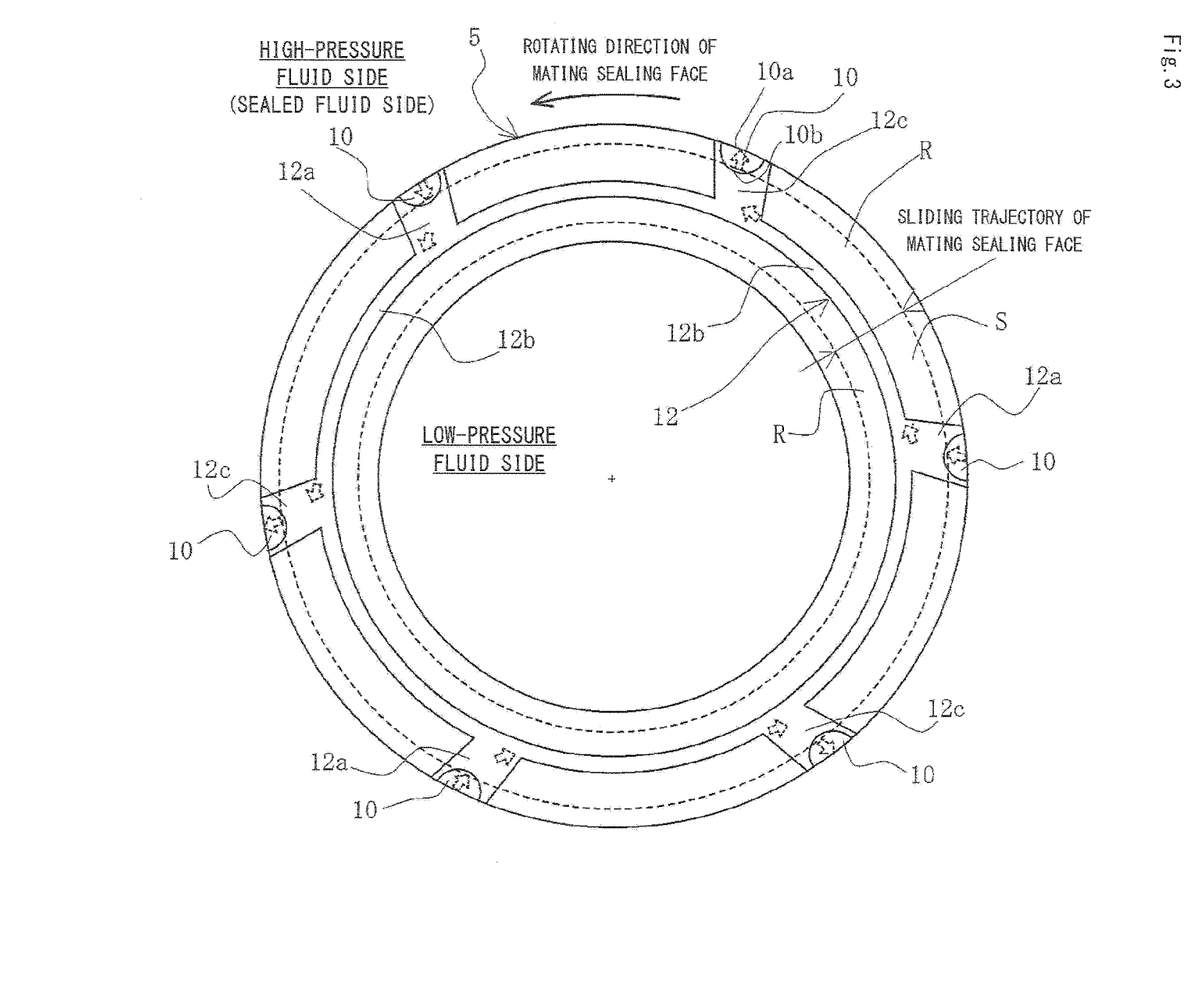
FIG. 3 is a front view of the stationary sealing ring of the mechanical seal according to a second embodiment of the present invention.

In addition, the same reference numbers as those of FIG. 1 and FIG. 2 indicate the same members in FIG. 3 and the descriptions overlapped with the first embodiment will be omitted.

In FIG. 3, a fluid circulation groove 12 communicated with the high-pressure fluid side and separated from the low-pressure fluid side by a smoothing portion R of the sealing face (the smoothing portion may be referred to as "a land portion" in the present invention) is provided in the sealing face S of the stationary sealing ring 5.

The fluid circulation groove 12 is configured by an inlet portion 12a through which the fluid flows in from the high-pressure fluid side, an outlet portion 12c through which the fluid flows out to the high-pressure fluid side, and a communication portion 12b which allows a pair of the inlet portion 12a and the outlet portion 12c to communicate with each other in the circumferential direction, and the fluid circulation groove 12 is separated from the low-pressure fluid side by the land portion R. In FIG. 3, the fluid circulation grooves 12 are provided at equal intervals in the circumferential direction, and the communication portions 12b are connected to one another in the circumferential direction. These fluid circulation grooves 12 have a role in actively introducing the sealed fluid from the high-pressure fluid side to the sealing face and discharging the sealed fluid in order to prevent the fluid containing corrosion products or the like from being condensed on the sealing face. The fluid circulation groove 12 is provided with the inlet portion 12a and the outlet portion 12c so that the sealed fluid easily flows in to the sealing face and flows out in accordance with a rotating direction of the mating sealing face, and meanwhile, the fluid circulation groove 12 is separated from the low-pressure fluid side by the land portion R to reduce leakage of the fluid.

A width and a depth of the fluid circulation groove 12 are appropriately established in accordance with a pressure, the type (viscosity), or the like of the sealed fluid. For example, the depth is established at a value from several tens of micrometers to several hundreds of micrometers. Further, in an example described here, the inlet portion 12a and the outlet portion 12c are formed to be radially wider than the communication portion 12b.

The fluid introduction groove 10 is formed at least in the inlet portion 12a among the inlet portion 12a and the outlet portion 12c. In FIG. 3, the fluid introduction grooves 10 are formed in both the inlet portion 12a and the outlet portion 12c, and even in a case where the rotating direction of the rotating sealing ring 3 changes, the sealed fluid can flow in and out.

In accordance with circulation of the sealed fluid along with rotation of the rotating sealing ring 3, the sealed fluid flows in and out through a radial groove 26 between the sealed fluid side and a pressure release groove 25.

In accordance with the circulation of the sealed fluid along with the rotation of the rotating sealing ring 3, the sealed fluid is supplied through the inlet portion 12a to the sealing face. At this time, the lubricative liquid in the form of mist is attached to or condensed in the opening portion 10a of the fluid introduction groove 10 to be supplied by the gravity and the pressure difference between the opening portion 10a and the end portion 10b to the clearance between the respective sealing faces S of the rotating sealing ring 3 and the stationary sealing ring 5 that face each other; thereby, the lubricated condition of the respective sealing faces S can be improved. The fluid introduction groove 10 is provided to be located at least within the inlet portion 12a; therefore, the lubricative liquid is further supplied to the clearance between the respective sealing faces S.

The mechanical seal of the second embodiment is configured so that the fluid introduction groove 10 is provided in the fluid circulation groove 12, therefore increasing the volume of the sealed fluid to be introduced to the sealing face S. Thus, even in a case where the sealed fluid is, for example, a fluid of a mixture of a gas in which a lubricative liquid such as oil in the form of mist exists and a liquid, the function effect that the lubricated condition of the respective sealing faces S can be improved is further achieved.

Third Embodiment

The mechanical seal according to a third embodiment of the present invention will be described with reference to FIG. 4 and FIG. 5.

Figure 4:
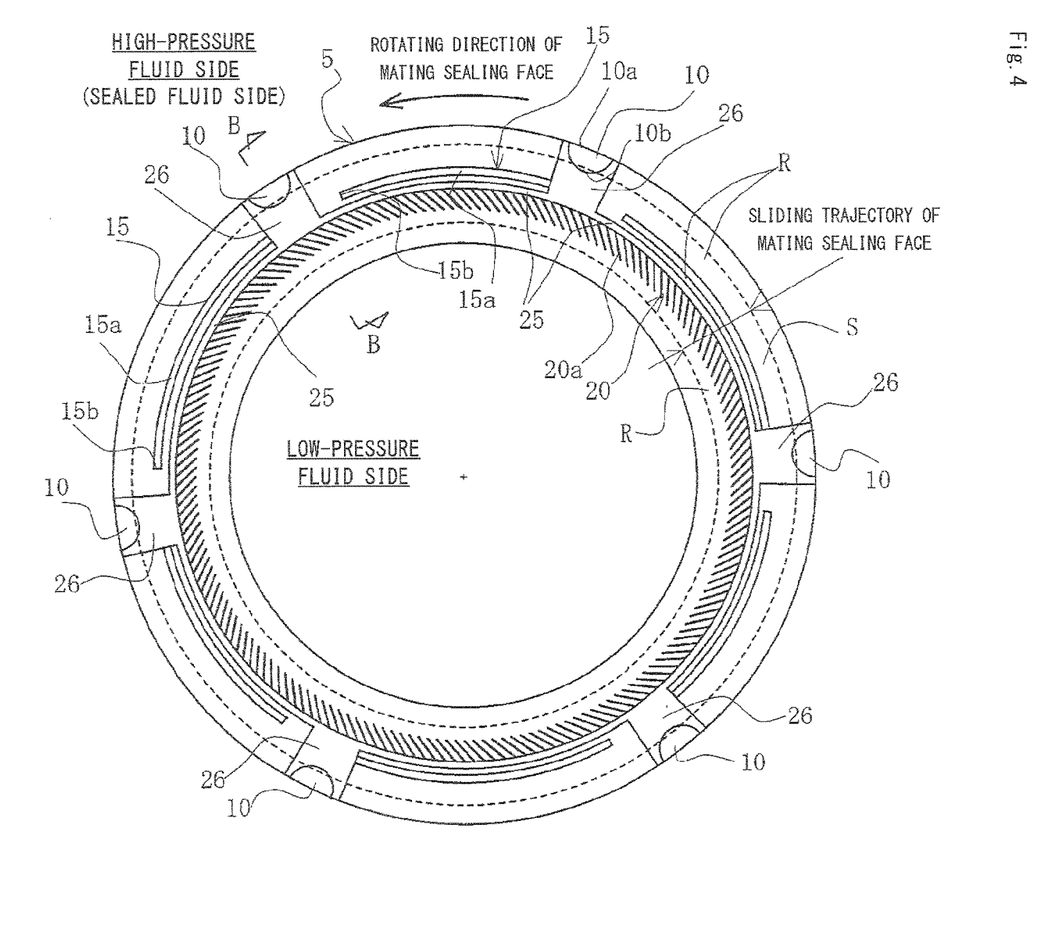
FIG. 4 is a front view of the stationary sealing ring of the mechanical seal according to a third embodiment of the present invention.
Figure 5:
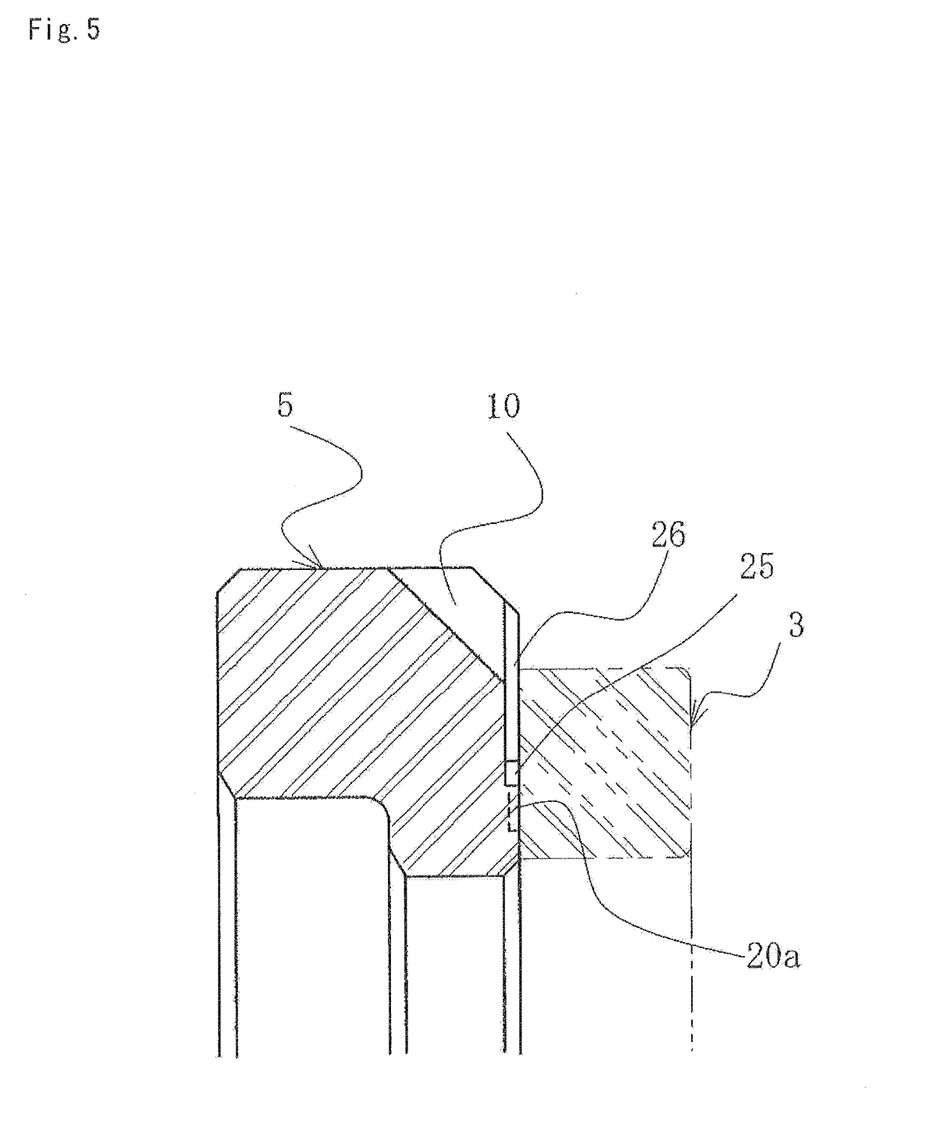
FIG. 5 is a cross-sectional view taken along the line B-B of FIG. 4.

In addition, the same reference numbers as those of FIG. 1 and FIG. 2 indicate the same members in FIG. 4 and FIG. 5 and the descriptions overlapped with the first embodiment will be omitted.

In FIG. 4, a positive pressure generation mechanism 15, for example, a Rayleigh step mechanism which includes a groove 15a and a Rayleigh step 15b is provided on the sealing face S of the stationary sealing ring 5 at the high-pressure fluid side. The positive pressure generation mechanism 15 generates a positive pressure in accordance with relative rotation and sliding between the stationary sealing ring 5 and the rotating sealing ring 3. The positive pressure generation mechanism 15 is separated from the high-pressure fluid side and the low-pressure fluid side by the land portion R (corresponding to the smoothing portion of the sealing face S), and the six positive pressure generation mechanisms 15 are provided at equal intervals in the circumferential direction.

In addition, the six positive pressure generation mechanisms 15 are provided at equal intervals in FIG. 4, but not limited thereto. Namely, one or more positive pressure generation mechanisms 15 may be provided.

Further, a pumping portion 20 is arranged in an annular shape on the sealing face S, which is located adjacent to the low-pressure fluid side compared to the positive pressure generation mechanism 15, so as to be separated from the positive pressure generation mechanism 15 in the radial direction. The pumping portion 20 produces a pumping effect to return the sealed fluid to the high-pressure side in accordance with the relative rotation and sliding between the stationary sealing ring 5 and the rotating sealing ring 3. A spiral groove 20a is provided in the pumping portion 20.

Furthermore, an annular pressure release groove 25 is continuously arranged in the circumferential direction so as to be located between the pumping portion 20 and the positive pressure generation mechanism 15. The pressure release groove 25 is separated from the groove 15a of the positive pressure generation mechanism 15 in the radial direction by the land portion R and is connected to a discharge end portion (downstream end portion) of the spiral groove 20a of the pumping portion 20.

Six radial grooves 26 are provided at equal intervals so that each radial groove 26 is substantially perpendicular to a tangent line, which contacts the pressure release groove 25, so as to allow communication between the pressure release groove 25 and the high-pressure fluid side. The radial groove 26 is positioned in contact with an upstream end portion of the groove 15a of the positive pressure generation mechanism. 15 in the circumferential direction.

Depths of the groove 15a and the spiral groove 20a are small, for example, about several micrometers, and depths of the pressure release groove 25 and the radial groove 26 are larger than the depths of the groove 15a and the spiral groove 20a and are established, for example, at a value from several tens of micrometers to several hundreds of micrometers.

Further, in an example described here, the radial groove 26 is formed to be radially wider than the pressure release groove 25.

The aforementioned positive pressure generation mechanism 15 is provided to improve the lubricity by generating a positive pressure (dynamic pressure) to increase the clearance between the sealing faces S relatively sliding against each other and form liquid films on the sealing faces S.

Further, the fluid is likely to leak to the low-pressure side due to the positive pressure (dynamic pressure) generated in the positive pressure generation mechanism 15 at the high-pressure side, and the spiral groove 20a therefore serves to discharge such fluid to the high-pressure side to increase a sealing effect on the sealing face S.

Furthermore, the pressure release groove 25 releases the positive pressure (dynamic pressure), generated in the positive pressure generation mechanism 15 at the high-pressure side, to a pressure of the high-pressure fluid, thereby preventing the fluid from flowing in the spiral groove 20a at the lower-pressure side and avoiding a decline in a negative pressure generating ability of the spiral groove 20a. That is, the fluid likely to flow toward the low-pressure side due to the pressure generated in the positive pressure generation mechanism 15 at the high-pressure side is introduced to the pressure release groove 25 to be released through the radial groove 26 to the high-pressure fluid side.

The fluid introduction groove 10 is provided in the radial groove 26 so as to be opened to the sealed fluid side in a state where the end portion 10b opposite to the opening portion 10a is located between the respective sealing faces S.

As described above, the radial groove 26 allows communication between the sealed fluid side and the pressure release groove 25 and thereby functions to release the pressure, generated in the positive pressure generation mechanism 15, to the high-pressure fluid side. Meanwhile, in accordance with circulation of the sealed fluid along with rotation of the rotating sealing ring 3, the sealed fluid flows in and out through the radial groove 26 between the sealed fluid side and the pressure release groove 25.

In an example described here, the lubricative liquid in the form of mist is attached to or condensed in the opening portion 10a of the fluid introduction groove 10 to be supplied by the gravity and the pressure difference between the opening portion 10a and the end portion 10b to the clearance between the respective sealing faces S of the rotating sealing ring 3 and the stationary sealing ring 5 that face each other; thereby, the lubricated condition of the respective sealing faces S can be improved. In addition, the fluid introduction groove 10 is provided so as to be located in the radial groove 26; therefore, the lubricative liquid is further supplied to the clearance between the respective sealing faces S. Additionally, in this case, the sealed fluid is supplied through the radial groove 26 to the positive pressure generation mechanism 15. The fluid introduction groove 10 is provided in this radial groove 26; therefore, the sealed fluid is further supplied to the radial groove 26. As a result, the sealed fluid is likewise further supplied to the positive pressure generation mechanism 15.

The mechanical seal of the third embodiment is configured so that the lubricity is improved by the positive pressure generation mechanism 15 and so that the sealing effect is increased by the spiral groove 20a and the pressure release groove 25. In such mechanical seal, the fluid introduction groove 10 is provided in the radial groove 26, therefore increasing the volume of the sealed fluid to be introduced to the sealing face S. Thus, even in a case where the sealed fluid is, for example, a fluid of a mixture of a gas in which a lubricative liquid such as oil in the form of mist exists and a liquid, the function effect that the lubricated condition of the respective sealing faces S can be improved is further achieved.

Fourth Embodiment

The mechanical seal according to a fourth embodiment of the present invention will be described with reference to FIG. 6.

Figure 6:
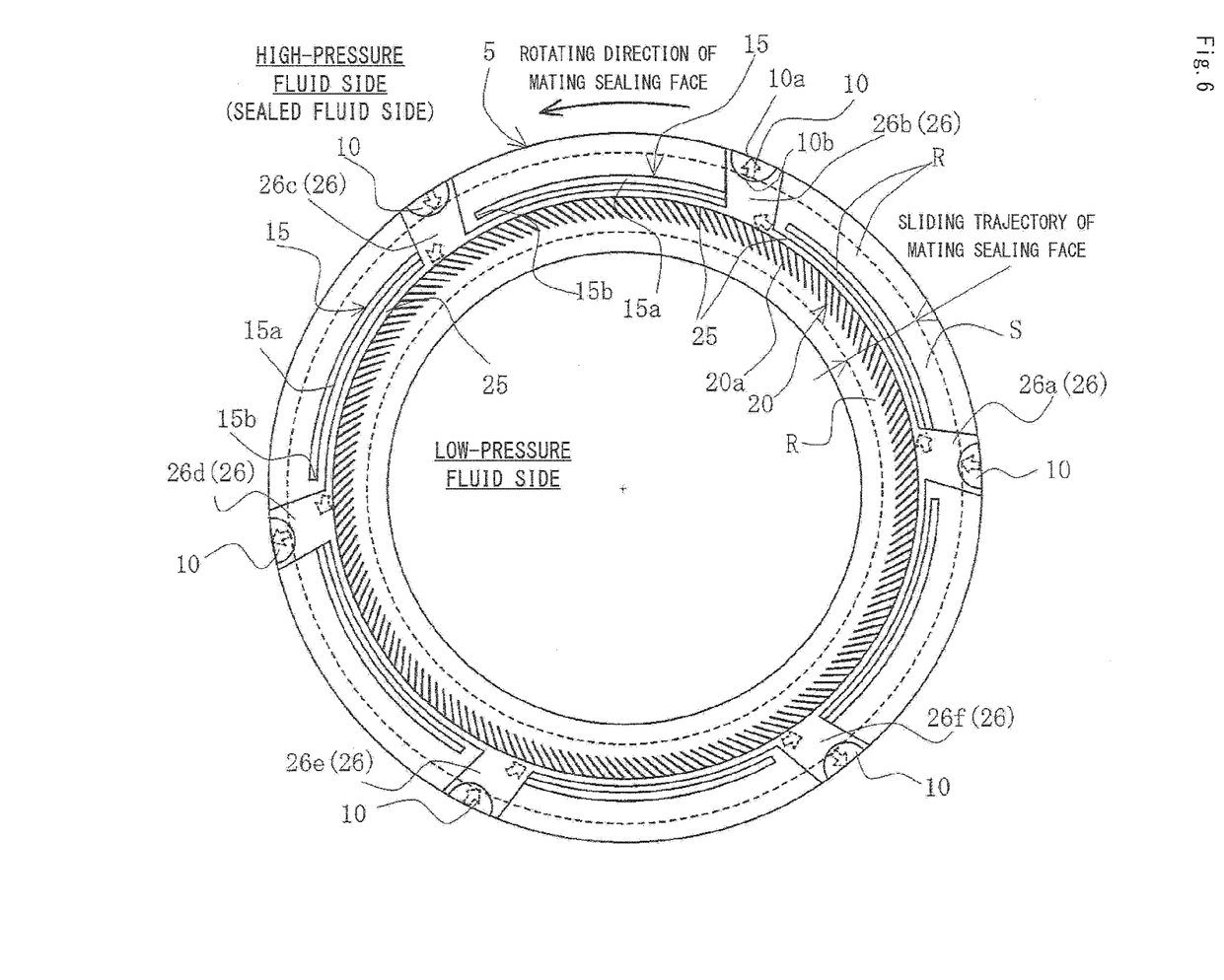
FIG. 6 is a front view of the stationary sealing ring of the mechanical seal according to a fourth embodiment of the present invention.

In addition, the same reference numbers as those of FIG. 4 and FIG. 5 indicate the same members in FIG. 6 and the descriptions overlapped with the third embodiment will be omitted.

In an example described here, the six radial grooves are divided into three pairs of radial grooves. In the respective pairs of radial grooves 26a and 26b, 26c and 26d, and 26e and 26f, radially outward portions of the radial grooves 26a, 26c, and 26e located at the upstream side are inclined toward the upstream side so that the sealed fluid may easily flow in. In addition, radially outward portions of the radial grooves 26b, 26d, and 26f located at the downstream side are inclined toward the downstream side so that the sealed fluid may be easily discharged.

That is, even numbers of radial grooves 26 are arranged in the circumferential direction, and the radial grooves 26 arranged next to each other are inclined in different directions from each other. Inlet ports of the radial grooves 26a, 26c, and 26e in one group are inclined toward the upstream side, and outlet ports of the radial grooves 26b, 26d, and 26f in the other group are inclined toward the downstream side.

In a case where the radial grooves 26 are provided to be inclined in this manner, gentle flows of the fluid as indicated by dashed arrows are generated within deep grooves configured by the pressure release grooves 25 and the radial grooves 26. Therefore, bubbles and impurities are prevented from remaining within the deep grooves, and the fluid likely to flow toward the low-pressure side due to the pressure generated in the positive pressure generation mechanism 15 at the high-pressure side can be surely released to the high-pressure fluid side. Consequently, sealing performance can be improved.

The fluid introduction groove 10 is provided within the radial groove 26 that is provided in an inclined manner.

The fluid introduction groove 10 is located in the gentle flow of the fluid within the radial groove 26 that is provided in an inclined manner; therefore, the sealed fluid can be further supplied to the respective sealing faces S. Furthermore, in this case, the sealed fluid is supplied through the radial groove 26 to the positive pressure generation mechanism 15. The fluid introduction groove 10 is provided in this radial groove 26; therefore, the sealed fluid is further supplied to the radial groove 26. As a result, the sealed fluid is likewise further supplied to the positive pressure generation mechanism 15.

The mechanical seal of the fourth embodiment is configured so that the lubricity is improved by the positive pressure generation mechanism 15 and so that the sealing effect is increased by the spiral groove 20a and the pressure release groove 25. In such mechanical seal, the fluid introduction groove 10 is provided in the radial groove 26 that is inclined so that the sealed fluid may easily flow in and out, therefore further increasing the volume of the sealed fluid to be introduced to the sealing face S. Thus, even in a case where the sealed fluid is, for example, a fluid of a mixture of a gas in which a lubricative liquid such as oil in the form of mist exists and a liquid, the function effect that the lubricated condition of the respective sealing faces S can be improved is further achieved.

Next, a positive pressure generation mechanism configured by a Rayleigh step mechanism or the like will be described with reference to FIG. 7.

Figure 7:
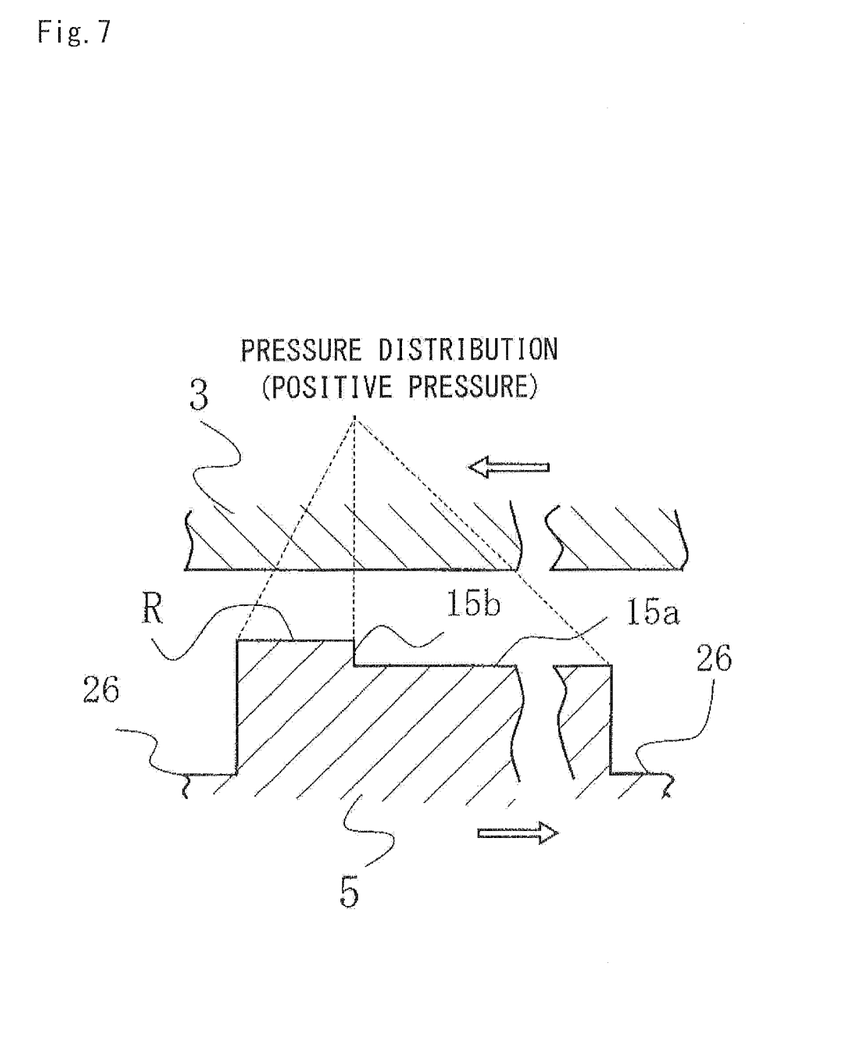

In FIG. 7, the rotating ring 3 and the stationary ring 5 that are sliding components facing each other relatively slide against each other as indicated by arrows. For example, the Rayleigh step 15b is formed on the sealing face of the stationary ring 5 so as to be in perpendicular to the relative moving direction and to face the upstream side. The groove portion 15a serving as a positive pressure generation groove is formed at the upstream side of the Rayleigh step 15b. The sealing faces of the rotating ring 3 and the stationary ring 5 facing each other are flat.

When the rotating ring 3 and the stationary ring 5 move relative to each other in directions indicated by the arrows, the fluid existing between the sealing faces of the rotating ring 3 and the stationary ring 5 may move due to the viscosity to follow the rotating ring 3 or the stationary ring 5 in the moving direction thereof. In this case, a positive pressure (dynamic pressure) as indicated by dashed lines is generated by the presence of the Rayleigh step 15b.

In addition, the land portion and the radial groove are respectively indicated by R and 26.

As described above, the embodiments of the present invention are described on the basis of the drawings; however, specific configurations may not be limited to these embodiments, and even changes or additions without departing from the scope of the present invention may be included in the present invention.

For example, a case where the high-pressure sealed fluid exists at the radially outward side is explained in the aforementioned embodiments. Alternatively, the present invention can be applied to a case where a high-pressure fluid exists at the radially inward side.

Further, for example, a case where the sealed fluid is, for example, a fluid of a mixture of a gas in which a lubricative liquid such as oil in the form of mist exists and a liquid is explained in the aforementioned embodiments; however, the present invention is not limited thereto. Even in a case where the sealed fluid contains only liquid, the effect can be achieved.

Furthermore, for example, a case where the outer diameter of the stationary sealing ring 5 is larger than the outer diameter of the rotating sealing ring 3 is shown in the drawings in the aforementioned embodiments; however, the present invention is not limited thereto. Even in an opposite case, the present invention can be applied.

In addition, for example, a case where a fluid discharging means is configured by the spiral groove 20*a* is explained in the aforementioned embodiments, but not limited thereto. Alternatively, the fluid discharging means may be configured by a dimple.

Moreover, for example, a case where the six positive pressure generation mechanisms 15 are provided at equal intervals and the six radial grooves 26 are provided at equal intervals is explained in the third and fourth embodiments, but not limited thereto. At least the single positive pressure generation mechanism and the single radial groove may be provided.

REFERENCE SIGNS LIST

1 Rotating shaft
2 Sleeve
3 Rotating sealing ring
4 Housing
5 Stationary sealing ring
6 Biasing member
10 Fluid introduction groove
10*a* Opening portion of fluid introduction groove
10*b* End portion of fluid introduction groove
10*c* Bottom surface of fluid introduction groove
10*d* Side surface of fluid introduction groove
15 Positive pressure generation mechanism
15*a* Groove
15*b* Rayleigh step
20 Pumping portion
20*a* Spiral groove
26 Pressure release groove
26 Radial groove
S Sealing face
R Land portion

The invention claimed is:

1. A mechanical seal comprising:
an annular stationary sealing ring fixed to a fixed side;
an annular rotating sealing ring configured to rotate along with a rotating shaft in a facing manner to the stationary sealing ring to rotate respective sealing faces relative to each other to seal a sealed fluid which exists at one side in a radial direction of the respective sealing faces that rotate and slide relative to each other;
a fluid introduction groove provided in the sealing face of the stationary sealing ring and having an opening portion which is opened to the sealed fluid and an end portion which is provided opposite to the opening portion, the end portion of the fluid introduction groove being located between the respective sealing faces, the fluid introduction groove introducing the sealed fluid from the opening portion to a clearance between the respective sealing faces, the fluid introduction groove being provided to be inclined at an acute angle to the sealing face of the stationary sealing ring in a direction from the end portion to the opening portion; and
a fluid circulation groove provided in one of the sealing faces, relatively sliding against each other, of a pair of sliding components, the fluid circulation groove including: an inlet portion through which the fluid flows in from a high-pressure fluid side; an outlet portion through which the fluid flows out to the high-pressure fluid side; and a communication portion which allows communication between the inlet portion and the outlet portion, the fluid circulation groove being separated from a low-pressure fluid side by a land portion, wherein the fluid introduction groove is formed at least in the inlet portion among the inlet portion and the outlet portion.

2. A mechanical seal comprising:
an annular stationary sealing ring fixed to a fixed side;
an annular rotating sealing ring configured to rotate along with a rotating shaft in a facing manner to the stationary sealing ring to rotate respective sealing faces relative to each other to seal a sealed fluid which exists at one side in a radial direction of the respective sealing faces that rotate and slide relative to each other;
a fluid introduction groove provided in the sealing face of the stationary sealing ring and having an opening portion which is opened to the sealed fluid and an end portion which is provided opposite to the opening portion, the end portion of the fluid introduction groove being located between the respective sealing faces, the fluid introduction groove introducing the sealed fluid from the opening portion to a clearance between the respective sealing faces, the fluid introduction groove being provided to be inclined at an acute angle to the sealing face of the stationary sealing ring in a direction from the end portion to the opening portion;
a positive pressure generation mechanism provided at a sealed fluid side on the sealing face of the stationary sealing ring, for generating a positive pressure in accordance with relative rotation and sliding between the stationary sealing ring and the rotating sealing ring;
an annular pressure release groove provided at a low-pressure side compared to the positive pressure generation mechanism, the pressure release groove being separated from the positive pressure generation mechanism in the radial direction by a land portion; and
a radial groove provided to allow the pressure release groove to communicate with a high-pressure fluid side, the radial groove being positioned in contact with an upstream end portion of the positive pressure generation mechanism,
wherein the fluid introduction groove is provided in the radial groove.

3. The mechanical seal according to claim 2, wherein a pumping portion for producing a pumping effect to return the sealed fluid to a high-pressure side in accordance with the relative rotation and sliding between the stationary sealing ring and the rotating sealing ring is provided at a low-pressure side compared to an annular portion of the pressure release groove, and a discharge end portion of the pumping portion is connected to the pressure release groove.

4. The mechanical seal according to claim 2, wherein the radial groove includes even numbers of radial grooves which are circumferentially arranged, and
the radial grooves arranged next to each other are inclined in different directions from each other such that inlet ports of the radial grooves in one group are inclined toward an upstream side and outlet ports of the radial grooves in the other group are inclined toward a downstream side.

5. The mechanical seal according to claim 3, wherein the radial groove includes even numbers of radial grooves which are circumferentially arranged, and
the radial grooves arranged next to each other are inclined in different directions from each other such that inlet ports of the radial grooves in one group are inclined toward an upstream side and outlet ports of the radial grooves in the other group are inclined toward a downstream side.

* * * * *